(12) United States Patent
Shimizu et al.

(10) Patent No.: US 7,232,294 B2
(45) Date of Patent: Jun. 19, 2007

(54) COMPRESSOR HAVING A DISCHARGE VALVE MECHANISM INCLUDING A VALVE RETAINER HAVING A SPECIALLY-DESIGNED CURVED SURFACE

(75) Inventors: Shigemi Shimizu, Isesaki (JP); Shinji Nakamura, Isesaki (JP); Takahiro Ito, Isesaki (JP)

(73) Assignee: Sanden Corporation, Gunma (JP)

( * ) Notice: Subject to any disclaimer, the term of this patent is extended or adjusted under 35 U.S.C. 154(b) by 667 days.

(21) Appl. No.: 10/721,352

(22) Filed: Nov. 26, 2003

(65) Prior Publication Data

US 2004/0109778 A1 Jun. 10, 2004

(30) Foreign Application Priority Data

Dec. 4, 2002 (JP) ............... 2002-352249

(51) Int. Cl.
*F04B 27/12* (2006.01)
*F16K 15/14* (2006.01)
*F16K 15/16* (2006.01)

(52) U.S. Cl. ............... 417/571; 417/569; 417/269; 137/855; 137/856

(58) Field of Classification Search .............. 417/269, 417/569, 571; 137/855, 856
See application file for complete search history.

(56) References Cited

U.S. PATENT DOCUMENTS 5,848,882 A * 12/1998 Hashimoto et al. ......... 417/569
6,767,193 B2 * 7/2004 Hirose et al. ............... 417/269

FOREIGN PATENT DOCUMENTS

JP          625576          8/1994

* cited by examiner

*Primary Examiner*—Anthony D. Stashick
*Assistant Examiner*—Patrick Hamo
(74) *Attorney, Agent, or Firm*—Baker Botts L.L.P.

(57) ABSTRACT

In a compressor having a discharge valve mechanism, a valve retainer has a curved surface which is faced to and spaced from a movable portion of a flexible plate-like discharge valve and adapted to limit the movement of the movable portion. In a first direction parallel to the valve plate, the movable portion extends from a fixed portion, fixed to a valve plate, to face an exit end of a discharge hole of the valve plate. The curved surface has a plurality of parts different in radius of curvature from one another in a second direction parallel to the valve plate and perpendicular to the first direction.

6 Claims, 5 Drawing Sheets

COMPRESSOR HAVING A DISCHARGE VALVE MECHANISM INCLUDING A VALVE RETAINER HAVING A SPECIALLY-DESIGNED CURVED SURFACE

The present application claims priority to prior Japanese application JP 2002-352249, the disclosure of which is incorporated herein by reference.

BACKGROUND OF THE INVENTION

This invention relates to compressors and, in particular, to a discharge valve mechanism included in the compressors.

For example, an air conditioner often uses a so-called multicylinder compressor having a plurality of cylinder bores and a discharge valve mechanism corresponding to each of the cylinder bores. As the discharge valve mechanism, various types of mechanisms are proposed.

An example of the types is disclosed in Japanese Utility Model Application Publication No. H6-25576 (JP 6-25576 U) and comprises a valve plate having a plurality of discharge holes communicating with the cylinder bores, respectively. On an exit side of each of the discharge holes, a flexible plate-like discharge valve is overlapped with the valve plate.

The plate-like discharge valve has ends in a first direction parallel to the valve plate. One of the ends is fixed to the valve plate. Another of the ends is movable in a direction away from the valve plate with a bend of the plate-like discharge valve.

Furthermore, the discharge valve mechanism has a valve holder having a holding surface for limiting the bend of the plate-like discharge valve. The holding surface of the valve holder is inclined with respect to a second direction parallel to the valve plate and perpendicular to the first direction. With respect to the first direction, the holding surface of the valve holder is inclined and defines a curved surface. The curved surface has a substantially same radius of curvature at any part in the second direction.

The above-mentioned discharge valve mechanism is effective in suppressing noise of the compressor if the distance from the valve plate to the holding surface of the valve holder is reduced. In this case, however, the movable range of the plate-like discharge valve, i.e., the amount of lift of the valve is limited to be small. This may result in an increase of pressure loss at a high flow rate and an increase of internal pressure in each of the cylinder bores, leading to overcompression.

On the other hand, if the distance from the valve plate to the holding surface of the valve holder is increased, the overcompression is avoided but the effect of suppressing the noise of the compressor is insufficient.

SUMMARY OF THE INVENTION

It is therefore an object of the this invention to provide a compressor in which a noise is suppressed and which overcompression is avoided.

It is another object of the this invention to provide a compressor having a discharge valve mechanism in which a valve movable range is small in a normal operation and is automatically and smoothly increased at a high flow rate.

According to this invention, there is provided a compressor having a discharge valve mechanism which comprises a valve plate having a discharge hole communicating with a cylinder, a plate-like discharge valve being flexible, said plate-like discharge valve having a fixed portion fixed to the valve plate and a movable portion extending from the fixed portion in a first direction parallel to the valve plate, said movable portion being faced to an exit end of the discharge hole, and a valve retainer having a curved surface faced to and spaced from the movable portion and adapted to limit the movement of the movable portion, the curved surface having a plurality of parts different in radius of curvature from one another in a second direction parallel to the valve plate and perpendicular to the first direction.

DESCRIPTION OF THE PREFERRED EMBODIMENT

At first referring to FIG. 1, description will be made of a multicylinder compressor (hereinafter will simply be called a "compressor") having a discharge valve mechanism according to an embodiment of this invention.

Figure 1:
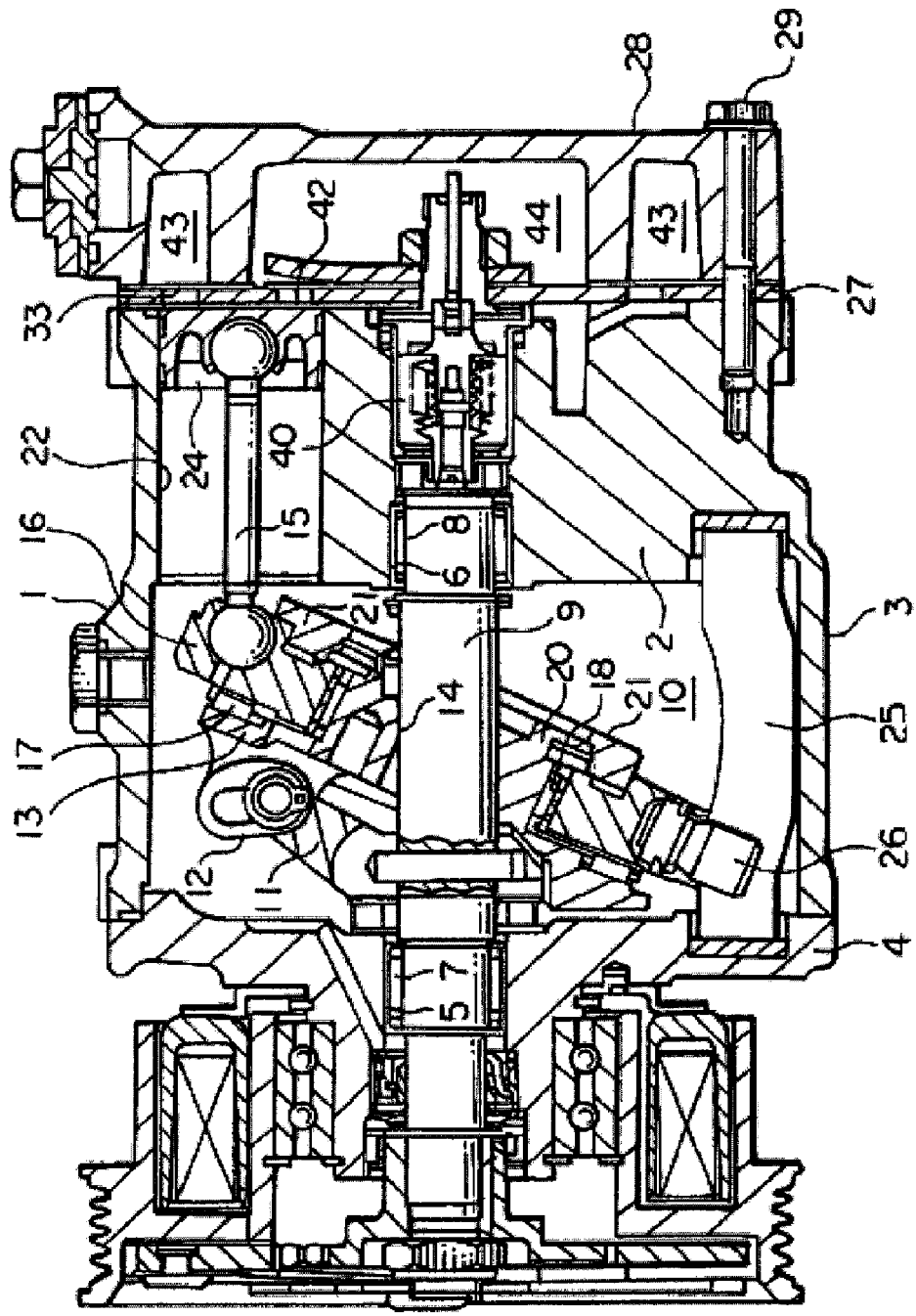
FIG. 1 is a vertical sectional view of a multicylinder compressor having a discharge valve mechanism according to one embodiment of this invention.

The compressor illustrated in FIG. 1 comprises a casing 1. The casing 1 comprises a generally cylindrical housing 3 integral with a cylinder block 2 formed at its one end, and a generally disk-shaped front end plate 4 closing an opening at the other end of the housing 3. The cylinder block 2 and the front end plate 4 are provided with through holes 5 and 6, respectively. A spindle 9 rotatably supported by bearings 7 and 8 are inserted through the through holes 5 and 6. In a crank chamber 10 defined between the cylinder block 2 and the front end plate 4, a rotor 11 attached to the spindle 9 is disposed.

To the rotor 11, a swash plate 13 is attached through a hinge mechanism 12. The swash plate 13 has an internal wall surface 14 to be slidable in contact with the spindle 9. By the hinge mechanism 12, the swash plate 13 is variable in tilting angle with respect to the spindle 9. To the swash plate 13, a wobble plate 16 coupled to a plurality of piston rods 15 by ball coupling joint is fitted through bearings 17 and 18. The swash plate 13 has a center boss 20 and a balance ring 21 fitted thereto. The balance ring 21 is rotatable together with the swash plate 13. The wobble plate 16 is interposed and clamped between the swash plate 13 and the balance ring 21.

The cylinder block 2 has a plurality of, for example, seven cylinder bores (only one being illustrated in the figure) 22 formed around the spindle 9 at predetermined intervals from one another. A piston 23 is inserted into each of the cylinder bores 22. The piston rod 15 is connected by ball coupling joint to a holding portion 24 of the piston 23.

Furthermore, a guide rod 25 parallel to the spindle 9 is disposed in the crank chamber 10. The guide rod 25 has one end and the other end rotatably supported by the cylinder block 2 and the front end plate 4, respectively. The guide rod 25 is clamped by a clamping portion 26 of the wobble plate 16. Thus, the wobble plate 16 is prevented from rotation (rotation around its own axis) and performs wobbling motion alone.

Figure 2:
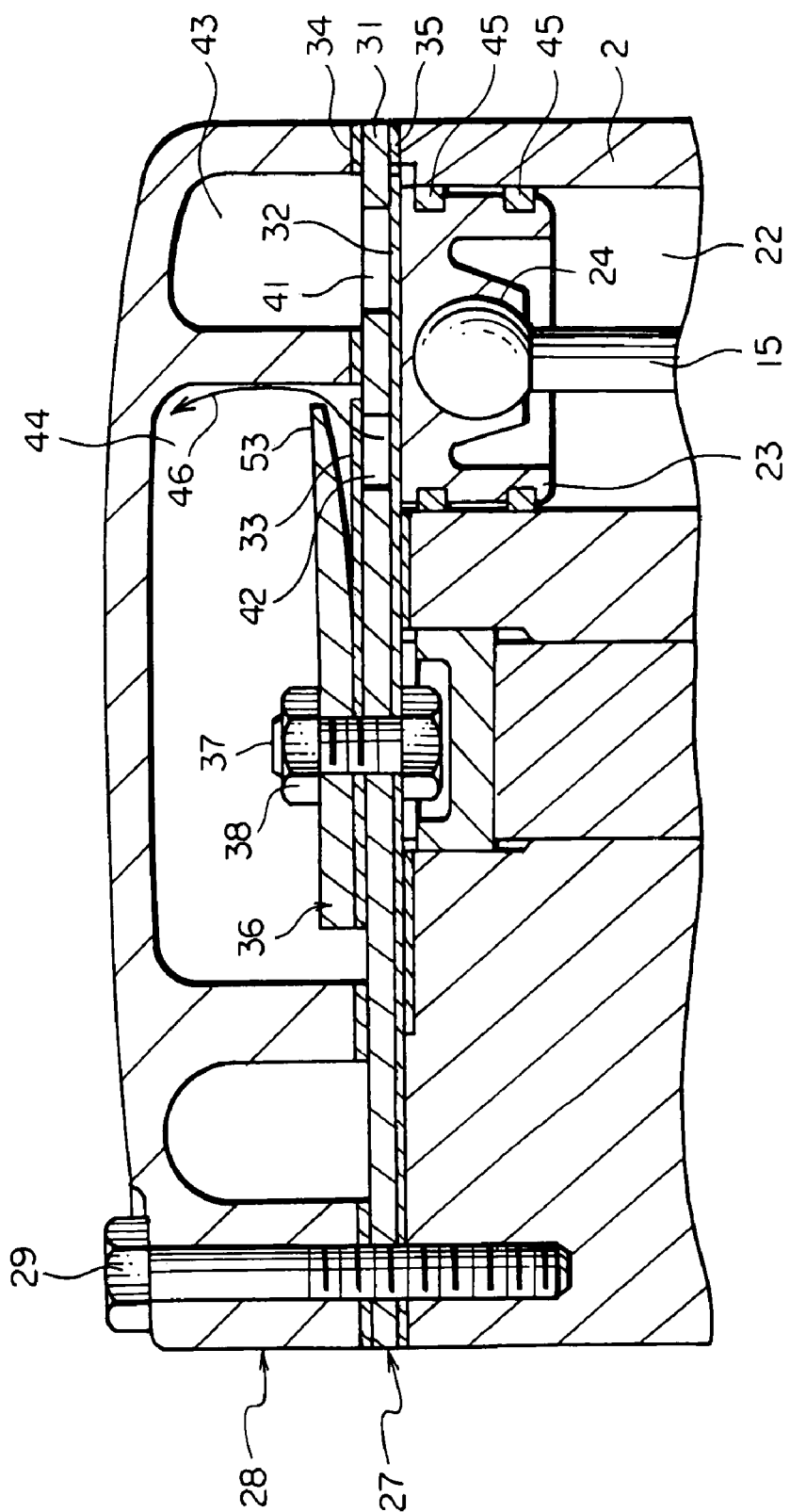
FIG. 2 is an enlarged sectional view schematically showing a characteristic part of the multicylinder compressor illustrated in FIG. 1.

Additionally referring to FIG. 2 schematically showing a characteristic part of the above-mentioned multicylinder compressor, the description will proceed further.

The cylinder block 2 has an axial end face to which a valve plate assembly 27 and a cylinder head 28 are coupled via a bolt 29 or the like. The valve plate assembly 27 comprises a valve plate 31, a plurality of plate-like suction valves (only one being illustrated in the figure) 32 made of a flexible material, a plurality of plate-like discharge valves (only one being illustrated in the figure) 33 made of a flexible material, gaskets 34 and 35, and a valve retainer 36 for limiting a bend of the plate-like discharge valves 33. The suction valves 32, the discharge valves 33, the gaskets 34 and 35, and the valve retainer 36 are fixed to the valve plate 31 via a bolt 37 and a nut 38. The valve plate 31 has a plurality of suction holes (only one being illustrated in the figure) 41 and a plurality of discharge holes (only one being illustrated in the figure) 42. Each of the suction holes 41 and each of the discharge holes 42 correspond to each of the cylinder bores 22 and communicate with each of the cylinder bores 22. The plate-like suction valves 32 and the plate-like discharge valves 33 are disposed in one-to-one correspondence to the suction holes 41 and the discharge holes 42. The valve retainer 36 will later be described in detail.

The cylinder head 28 has a suction chamber 43 and a discharge chamber 44. The suction chamber 43 is formed along the periphery of the cylinder head 28 and is communicable with all of the suction holes 41 with an action of the plate-like suction valves 32. The discharge chamber 44 is formed at a center area of the cylinder head 28 and is communicable with all of the discharge holes 42 with an action of the plate-like discharge valve 33. The suction chamber 43 and the discharge chamber 44 are connected to both ends of a refrigerating circuit (not shown) through a suction port and a discharge port (not shown).

Further, each of the pistons 23 is provided with a plurality of piston rings 45 in frictional contact with the cylinder bore 22. At a center portion of the cylinder block 2, a control valve 40 for controlling communication between the crank chamber 10 and the suction chamber 43 is disposed as illustrated in FIG. 1.

In the above-mentioned compressor, when the piston 23 moves downward in FIG. 2, a fluid or refrigerant is sucked through the suction port into the suction chamber 43 and flows from the suction chamber 43 through the suction hole 41, opening the plate-like suction valve 32, to be sucked into the cylinder bore 22. At this time, the plate-like discharge valve 33 is closed.

Next, the piston 23 moves upward in FIG. 2. Then, a compressed refrigerant is delivered from the cylinder bore 22 through the discharge hole 42, opening the plate-like discharge valve 33, to be discharged into the discharge chamber 44, as depicted by an arrow 46. At this time, the plate-like suction valve 32 is closed. The refrigerant circulates through the refrigerating circuit.

Figure 3:
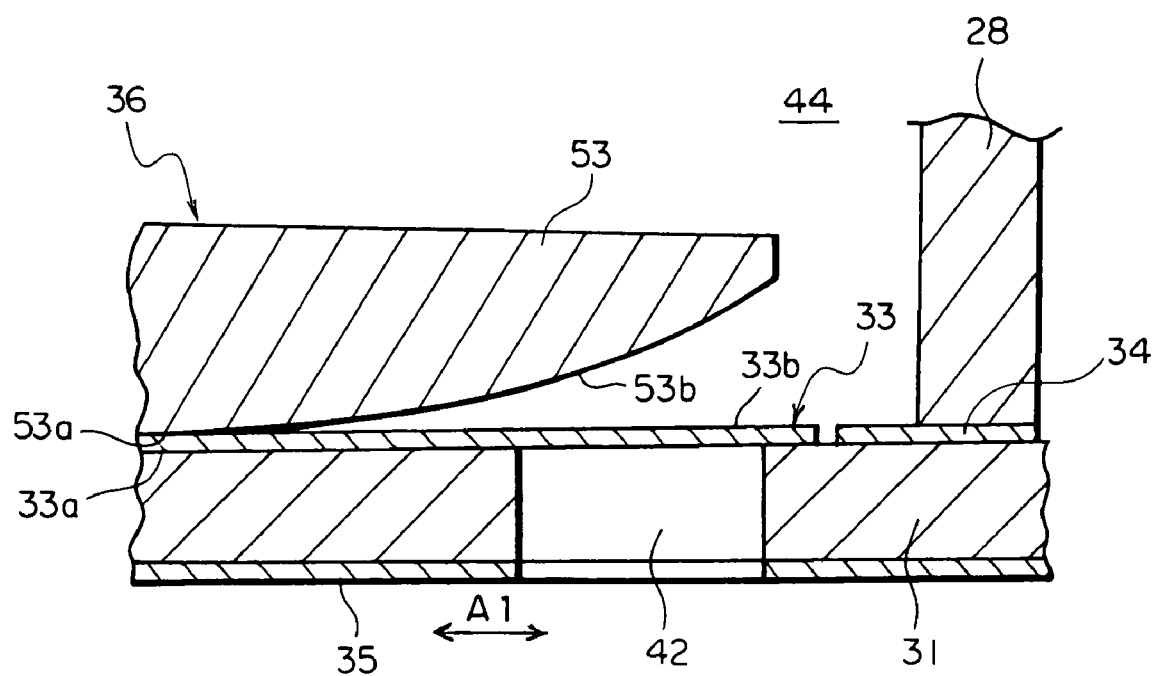
FIG. 3 is an enlarged sectional view of a discharge valve mechanism illustrated in FIG. 2.
Figure 4:
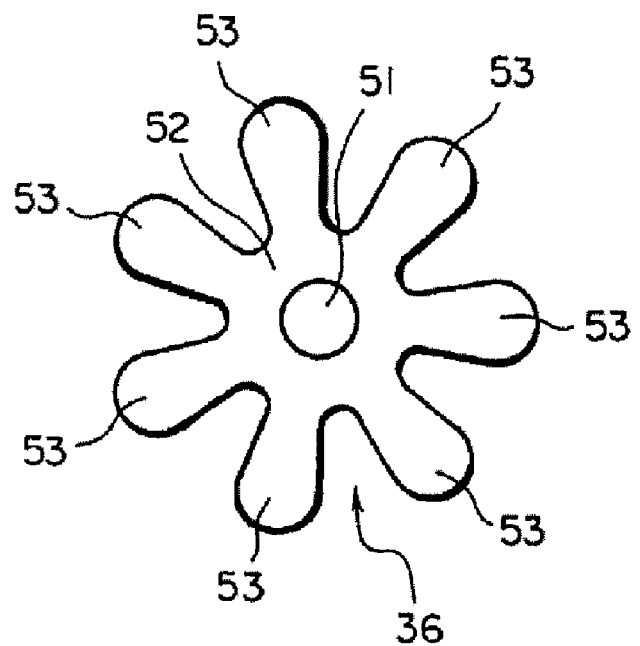
FIG. 4 is a plan view of a whole of a valve retainer used in the discharge valve mechanism illustrated in FIG. 3.

Referring to FIGS. 3 and 4 in addition to FIG. 2, the description will be made of the discharge valve 33 and the valve retainer 36.

As illustrated in FIG. 3, the plate-like discharge valve 33 has a fixed portion 33a fixed to the valve plate 31, and a movable portion 33b extending from the fixed portion 33a in a first direction A1 parallel to the valve plate 31 and faced to an exit end of the discharge hole 42. During suspension of operation of the compressor, the movable portion 33b is brought into contact with the valve plate 31 to cover the discharge hole 42. During operation of the compressor, the movable portion 33b repeatedly brought into and out of contact with the valve plate 31 following reciprocal motion of the piston 23.

As illustrated in FIG. 4, the valve retainer 36 has a fixed portion 52 provided with a through hole 51 for insertion of the bolt 37, and a predetermined number of valve-receiving portions 53 protruding radially outward from the fixed portion 52. The predetermined number corresponds to the number of the cylinder bores 22 and, in this case, is equal to seven. Each of the valve-receiving portions 53 extends to a position corresponding to the discharge hole 42, like the plate-like discharge valve 33. Each valve-receiving portion 53 has a flat surface 53a parallel to the valve plate 31 and overlapping the fixed portion 33a of the plate-like discharge valve 33, and a curved surface 53b faced to and spaced from the movable portion 33b of the plate-like discharge valve 33. The curved surface 53b of the valve-receiving portion 53 serves to limit the movement of the movable portion 33b of the plate-like discharge valve 33. A combination of the valve plate 31, a plate-like discharge valve 33, and the valve-receiving portion 53 is referred to as a discharge valve mechanism.

Referring to FIGS. 5 and 6A–6E in addition, the description will be made of the shape of the curved surface 53b of the valve-receiving portion 53.

In FIGS. 6A to 6E, the radii ra, rb, rc, rd, and re of curvatures of the curved surface 53b of the valve-receiving portion 53 are different from one another and are designed to have the following relationship:

$$ra > rb > rc > rd > re.$$

Figure 5:
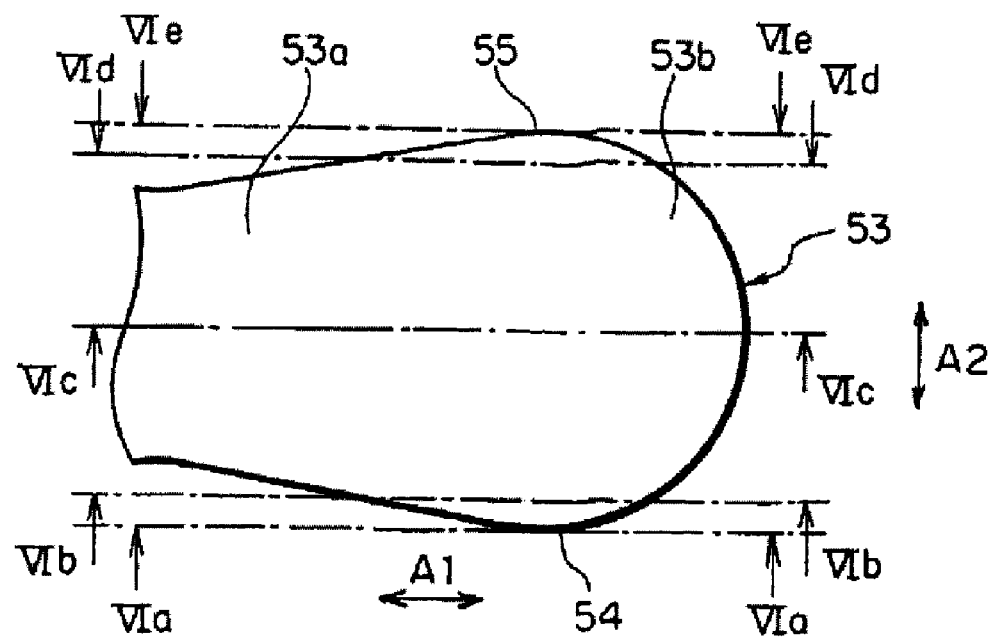
FIG. 5 is a plan view of a valve holder as a part of the valve retainer illustrated in FIG. 3.
Figure 6A:
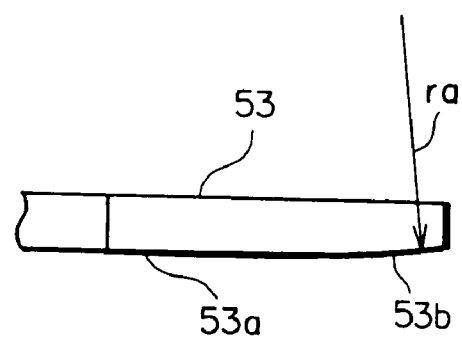
FIGS. 6A to 6E are partially sectional views (including side views) of the valve holder, taken along lines VIa—VIa, VIb—VIb, VIc—VIc, VId—VId, and VIe—VIe in FIG. 5, respectively.
Figure 6B:
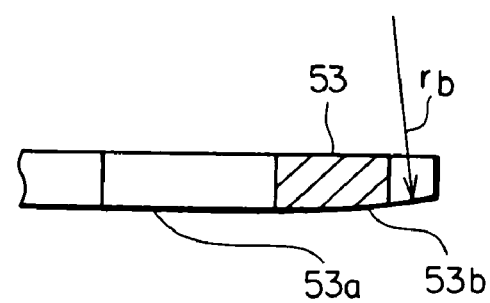
Figure 6C:
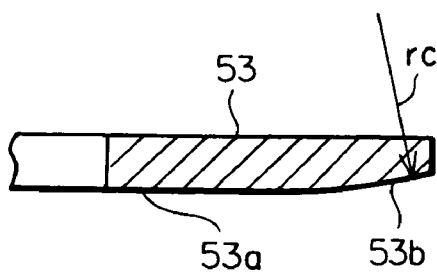
Figure 6D:
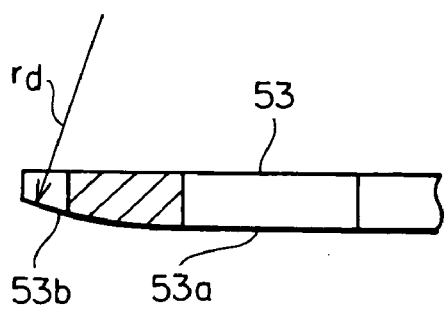
Figure 6E:
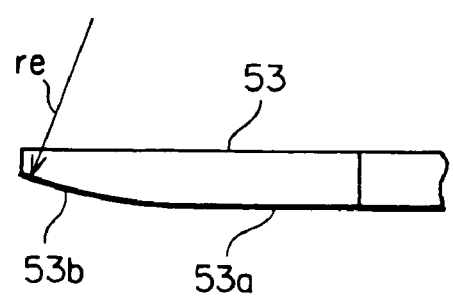

Specifically, the curved surface 53b of the valve-receiving portion 53 has a plurality of parts different in radius of curvature from one another in the second direction A2 parallel to the valve plate 31 and perpendicular to the first direction A1 in FIG. 5. These radii of curvature are gradually changed between the maximum value (ra) at one end of the curved surface 53b in the second direction A2 in FIG. 5, i.e., at a first end 54 and the minimum value (re) at the other end, i.e., a second end 55. A greater radius of curvature of the curved surface 53b means a smaller distance from the valve plate 31.

During operation of the compressor in a normal mode, the plate-like discharge valve 33 is moved within a movable range between the valve plate 31 and the first end 54 of the curved surface 53b to open and close the discharge hole 42. In this case, the operation is performed in a state where the movable range of the plate-like discharge valve 33 is small. Thus, the noise suppression effect is achieved.

On the other hand, during operation of the compressor at a high flow rate, the plate-like discharge valve 33 is brought into contact with the first end 54 of the curved surface 53b and is twisted along the curved surface 53b. At this time, the plate-like discharge valve 33 is allowed to open until it is brought into contact with the second end 55 of the curved surface 53b at maximum. Thus, the plate-like discharge valve 33 has a substantial moving range between the valve plate 31 and the second end 55 of the curved surface 53b and opens and closes the discharge hole 42. In this case, operation is performed in a state where the movable rage of the plate-like discharge valve 33 is great and over-compression is avoided. Thus, the effect is equivalent to that the substantial height of the valve-receiving portion 53 is automatically and smoothly changed depending upon the operating condition of the compressor to achieve an optimum condition.

As described above, the first end 54 of the curved surface 53b of the valve-receiving portion 53 defines a minimum movable range of the plate-like discharge valve 33 while the second end 55 defines a maximum movable range of the plate-like discharge valve 33. Herein, the ratio of the minimum movable range and the maximum movable range preferably falls within a range of 1.5–3.0.

The shape of the curved surface 53b of the valve-receiving portion 53 may be modified in various manners. For example, the curved surface 53b may be formed into a shape having a part along a conical shape or into a shape obtained by twisting a flat plane.

The above-mentioned compressor is normally operated in a state where the movable range of the valve is small. At a high flow rate, the movable range of the valve is automatically and smoothly increased. Thus, it is possible to achieve the noise suppression effect and to prevent the problem of over-compression.

What is claimed is:

1. A compressor having a discharge valve mechanism which comprises:
    a valve plate having a discharge hole communicating with a cylinder;
    a plate-like discharge valve being flexible, said plate-like discharge valve having a fixed portion fixed to the valve plate and a movable portion extending from the fixed portion in a first direction parallel to the valve plate, said movable portion being faced to an exit end of the discharge hole; and
    a valve retainer having a curved surface faced to and spaced from the movable portion and adapted to limit the movement of the movable portion, the curved surface having a plurality of parts extending in a second direction perpendicular to the first direction, wherein each part of the plurality of parts is different in radius of curvature from one another.

2. The compressor according to claim 1, wherein the curved surface has a first and a second end opposite to each other in the second direction, the radius of curvature gradually varying to have a maximum value at the first end and to have a minimum value at the second end.

3. The compressor according to claim 2, wherein the first end of the curved surface defines a minimum movable range of the movable portion, the second end of the curved surface defining a maximum movable range of the movable portion, a ratio between the minimum movable range and the maximum movable range being designed between 1.5 and 3.0.

4. The compressor according to claim 2, wherein said curved surface smoothly varies between the first and the second ends.

5. The compressor according to claim 1, wherein the curved surface has a part along a conical shape.

6. The compressor according to claim 1, wherein the valve retainer has a flat surface parallel to the valve plate and overlapping the fixed portion of the plate-like discharge valve.

* * * * *